(12) United States Patent
Renau et al.

(10) Patent No.: US 10,614,188 B2
(45) Date of Patent: Apr. 7, 2020

(54) INTERACTIVE INCREMENTAL SYNTHESIS FLOW FOR INTEGRATED CIRCUIT DESIGN

(71) Applicant: The Regents of the University of California, Oakland, CA (US)

(72) Inventors: Jose Renau, Santa Cruz, CA (US); Rafael Trapani Posignolo, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 16/307,025

(22) PCT Filed: Jun. 30, 2017

(86) PCT No.: PCT/US2017/040440
§ 371 (c)(1),
(2) Date: Dec. 4, 2018

(87) PCT Pub. No.: WO2018/006048
PCT Pub. Date: Jan. 4, 2018

(65) Prior Publication Data
US 2019/0220553 A1 Jul. 18, 2019

Related U.S. Application Data

(60) Provisional application No. 62/356,788, filed on Jun. 30, 2016.

(51) Int. Cl.
*G06F 17/50* (2006.01)

(52) U.S. Cl.
CPC ........ *G06F 17/505* (2013.01); *G06F 17/5054* (2013.01); *G06F 17/5072* (2013.01); *G06F 2217/78* (2013.01); *G06F 2217/84* (2013.01)

(58) Field of Classification Search
CPC . G06F 17/505; G06F 17/5054; G06F 17/5072
(Continued)

(56) References Cited

U.S. PATENT DOCUMENTS 6,490,717 B1 12/2002 Pedersen
6,728,936 B1 4/2004 Watkins
(Continued)

*Primary Examiner* — Stacy Whitmore
(74) *Attorney, Agent, or Firm* — Lumen Patent Firm

(57) ABSTRACT

An interactive incremental synthesis flow for integrated circuit design includes performing a full synthesis [304] of a circuit design to produce an elaborated netlist and synthesized netlist; based on the elaborated netlist and synthesized netlist, automatically partitioning [306] the circuit design into invariant cone regions whose functionality do not change during synthesis; and performing an incremental synthesis [308] each time a change is made to the circuit design. The incremental synthesis includes performing an elaboration [318] of a module of the design containing the change; performing a structural comparison [310] between the elaborated netlist and a modified elaborated netlist to identify modified invariant cones containing the change; synthesizing [312] gates contained in the modified invariant cones; deleting from the synthesized netlist the gates contained within the modified invariant cones that have been changed; and inserting [314] the synthesized gates corresponding to the modified invariant cones into the synthesized netlist.

5 Claims, 8 Drawing Sheets

(58) Field of Classification Search
USPC .................................................. 716/103, 104
See application file for complete search history.

(56) References Cited

U.S. PATENT DOCUMENTS

| | | |
|---|---|---|
| 7,530,046 B1 | 5/2009 | Nixon |
| 7,620,927 B1 | 11/2009 | Ochotta |
| 8,010,923 B1 | 8/2011 | Srinivasan |
| 9,152,754 B2 | 10/2015 | Knapp |
| 2009/0031278 A1 | 1/2009 | McElvain |
| 2010/0218146 A1 | 8/2010 | Platzker |
| 2011/0093834 A1* | 4/2011 | Danna ................ G06F 16/9027 |
| | | 717/104 |

* cited by examiner

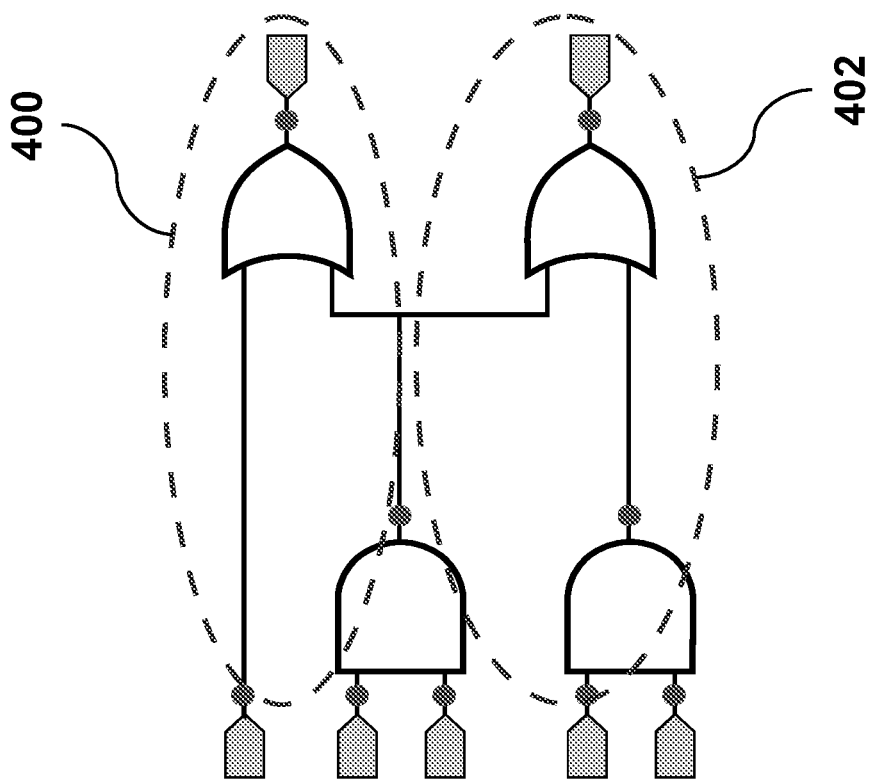
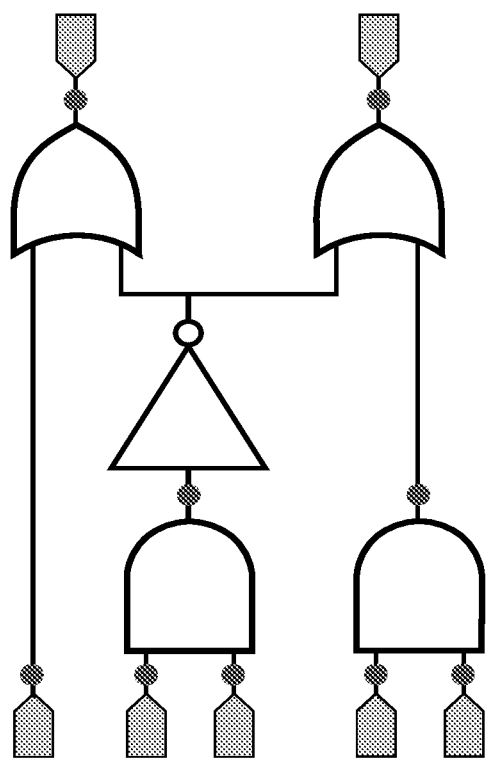
Fig. 4B
Fig. 4A

INTERACTIVE INCREMENTAL SYNTHESIS FLOW FOR INTEGRATED CIRCUIT DESIGN

CROSS-REFERENCE TO RELATED APPLICATIONS

This application is a 371 of PCT application PCT/US2017/040440 filed Jun. 30, 2017. PCT application PCT/US2017/040440 claims the benefit of U.S. Provisional application 62/356,788 filed Jun. 30, 2016.

FIELD OF THE INVENTION

This invention relates generally to methods for integrated circuit design and electronic design automation tools. More specifically, it relates to improved techniques for incremental logic synthesis.

BACKGROUND OF THE INVENTION

Currently, one of the major bottlenecks in digital design is synthesis. Synthesis is tedious and time consuming, especially during the timing/power closure cycle. Each iteration of relatively small changes in a design takes several hours to synthesize, putting pressure on designers to carefully consider when to submit jobs and wait for the delayed feedback. This delay is especially problematic in FPGA emulation, when synthesis is performed frequently while fixing the system functionality.

Triggering synthesis over the whole design is currently widely adopted in industry and academia alike. Nevertheless, usually, at a given iteration, a designer is focusing on one small portion of the circuit. In traditional synthesis, even if a small portion of the design is changed, logic synthesis and placement are triggered for large blocks and require hours to complete. This is due to two main reasons: tools are not designed for incremental synthesis, and inter-module optimization has a significant impact in QoR.

Recent research in incremental synthesis has proposed various approaches to incremental synthesis. One approach, for example, partitions the design into regions that are synthesized independently. After a change, only the partition is re-synthesized. The partitioning, however, is somewhat artificial. Consequently, there is a significant hit on QoR depending on the parameters choice. Since a single set of parameters is not applicable to any design, the utility of this approach is limited.

Even though the EDA industry has been trying to address the problem of long synthesis times, the current standards are either not fast enough or depend on manual interactions that often degrade design quality.

BRIEF SUMMARY OF THE INVENTION

The present invention provides a new approach for digital design with relatively quick feedback after small, incremental changes. This new synthesis workflow allows the designer to trigger synthesis results very frequently as the design is being modified. This results in quick feedback to further optimize the design without degrading quality. Synthesis is completed with close-to-optimal quality within a few seconds of processing time in most cases. The synthesis workflow is able to improve synthesis time over existing approaches by about ten times, with minimal impact on QoR. The synthesis workflow of the present invention is more efficient because it reduces the amount of work both in the RTL elaboration and in the final synthesis. An added benefit is that this synthesis workflow can also be used with different synthesis tools without accessing any code.

The invention provides an interactive incremental synthesis flow framework for integrated circuit design. Key features of the workflow include identifying invariant cones changed by a design change, and synthesizing only the extracted netlist containing the changed invariant cones, which replaces the original synthesized netlist. Only the small region that was modified is synthesized, which allows the synthesis to be performed in near real time.

In one aspect, method is provided for interactive incremental synthesis flow for integrated circuit design. The method includes performing a full synthesis of a circuit design to produce an elaborated netlist and synthesized netlist; based on the elaborated netlist and synthesized netlist, automatically partitioning the circuit design into invariant cone regions whose functionality do not change during synthesis; and performing an incremental synthesis each time a change is made to the circuit design. The incremental synthesis includes performing an elaboration of a module of the design containing the change; performing a structural comparison between the elaborated netlist and a modified elaborated netlist to identify modified invariant cones containing the change; synthesizing gates contained in the modified invariant cones; deleting from the synthesized netlist the gates contained within the modified invariant cones that have been changed; and inserting the synthesized gates corresponding to the modified invariant cones into the synthesized netlist. In preferred implementations, each of the invariant cone regions has endpoints that are functionally invariant boundaries. The automatic partitioning comprises identifying which gates belong to which invariant cone regions. Preferably, the invariant cone regions contain between 1000 and 5000 gates. The method may further include, when there are no pending incremental small jobs, removing from the synthesized netlist imperfections introduced in synthesizing gates contained in the modified invariant cones.

BRIEF DESCRIPTION OF THE SEVERAL VIEWS OF THE DRAWINGS

FIGS. 4A-B compare an original design with a modified design, illustrating how a final incremental synthesis region can include multiple cones, according to teachings of the present invention.

DETAILED DESCRIPTION OF THE INVENTION

Figure 1:
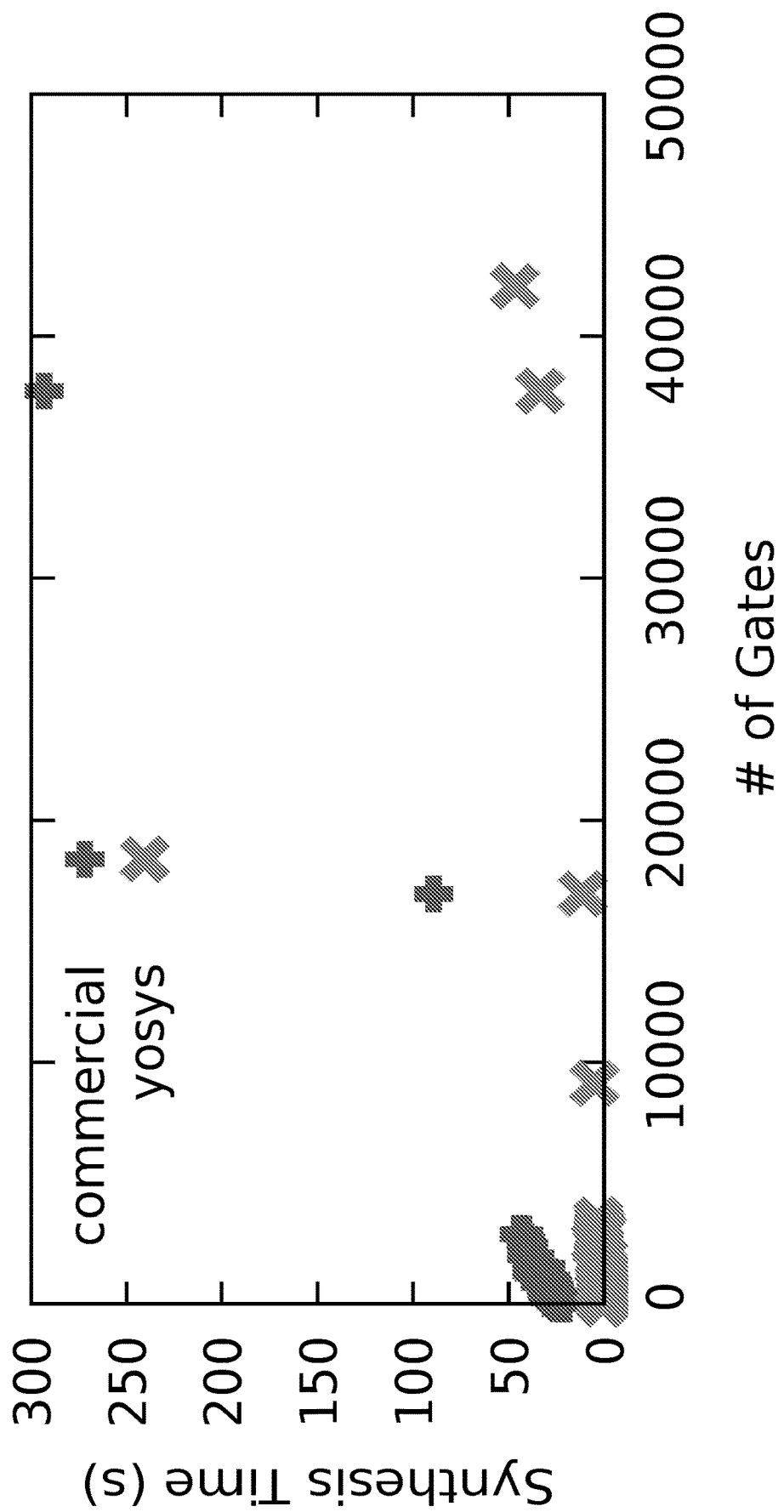
FIG. 1 is a graph of synthesis time vs. number of gates, illustrating how synthesis time varies super-linearly depending on design size, according to teachings of the present invention.

Embodiments of the present invention are implementations of an interactive incremental synthesis environment, referred to herein as LiveSynth. Using this synthesis flow, designers know within just a few seconds how their change to the design affects Quality of Results (QoR).

This flow allows more iterations per day, helping reduce the time for timing/power closure. Since iterations are fast, the designer can make more changes, and thus it is easier to track the impact of each change in the design. If the change did not positively impact QoR, it is easy and cheap to undo the change and proceed in another direction.

Synthesis is triggered as the designer types or saves the file (as long as it is possible to parse the design). This guarantees small enough increments while avoiding the undesirable old habits of experienced designers.

Embodiments of this LiveSynth incremental synthesis framework provides results in a few seconds to half a minute. Preferably, the workflow is tuned to provide results in under 30 seconds because that is the approximate time that the short-term memory lasts in humans. LiveSynth targets the front-end flow, and can be applied to ASICs and FPGAs. For purposes of illustration, the focus in embodiments described herein is FPGAs. Major FPGA vendors already support incremental place and route steps that could be leveraged by this workflow. LiveSynth is independent of the baseline tool.

LiveSynth works by creating an implementation for a modified RTL specification, utilizing as much as possible from a previous implementation for the original specification. Incremental flows rely on partitioning the design into regions that will be independently synthesized. Then, re-synthesis can be triggered in each region when a change occurs.

A goal of LiveSynth is highly optimizing the sub-region and triggering re-synthesis only when necessary, and not over the whole design. LiveSynth divides the design into multiple regions with invariant boundaries, i.e., regions whose boundaries' functionality has not been changed during synthesis. These regions are smaller than user-defined modules on average. When a change is made in the RTL description of the design, the synthesis flow needs only to find which regions were touched and replace them with the newly synthesized netlist.

Even though the each region is highly optimized, this process is much faster since the region is kept small. If part of the critical path is within the region, the neighboring regions may also be included in the high effort synthesis. This helps to maintain QoR, especially delay. Special care is given to the case where multiple instances of a module exist in the design. If the region frontiers are within the module, the region can be optimized alone, which yields a faster process. In the case where the region frontiers are outside the module, each instance must be dealt with separately.

LiveSynth automatically defines regions of a few thousand gates that are used as incremental grains. To reduce the impact on QoR, LiveSynth finds invariant cones, i.e., regions whose functionality do not change during synthesis. Intuitively, these cones define the regions across which no further optimization is possible (or necessary) during the initial synthesis. Although this is not always the case, these regions are a good starting point for the incremental phase of the synthesis. This is better than relying on a rather arbitrary hierarchical division, since it is well known that inter module optimization plays an important role in design optimization.

Overview of Flow

Figure 3:
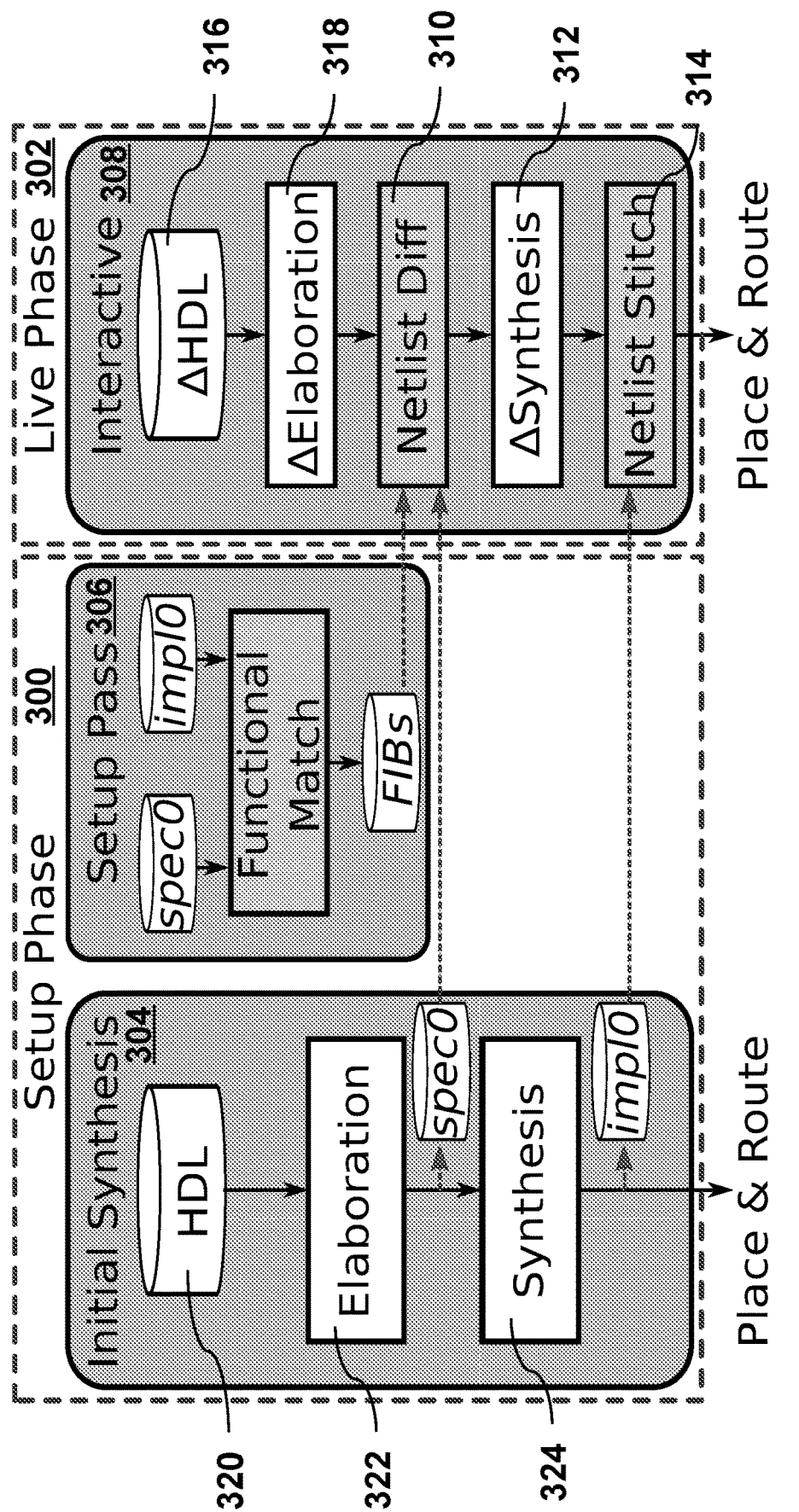
FIG. 3 is a schematic overview of the main processing steps of an interactive incremental synthesis method according to embodiments of the invention.

The overall flow of LiveSynth is depicted in FIG. 3. It includes two phases: a setup phase 300 and the live (i.e., interactive) phase 302. The setup phase 300 performs a regular synthesis of the whole design and also finds invariant regions, which are used as incremental grains for the live phase 302. The setup phase 300 includes an initial design synthesis 304 in which the design 320 is elaborated 322 and then synthesized 324 to produce the specification netlist (spec0) and the implemented netlist (impl0). The initial design synthesis 304 is followed by a setup pass 306 to determine equivalence between the specification netlist (spec0) and the implemented netlist (impl0). This setup pass 306 could be removed by integrating equivalence tracking into the initial synthesis step 304. Still, since the setup pass 306 is only executed once, the overhead from this pass is not a big problem. During the live phase 302, each time there is a change in the RTL, LiveSynth performs an interactive pass 308, which finds which regions were affected by the change and synthesizes only those regions. The algorithms are designed so that LiveSynth does not traverse the whole graph. Even a linear algorithm would not be competitive with the synthesis timing. This interactive, low-effort phase of the flow thus gives "live" feedback (within a few seconds) with good accuracy, but not necessarily fully optimized designs. In addition, a background process which has a slow turnaround time, may be used to optimize the design while the human works in the next set of changes. In other words, when there are no pending incremental small jobs, a background high-effort synthesis can be executed to improve the design quality. This background process aims to remove imperfections inserted by the live flow, thereby slowly improving the design implementation.

Setup Phase

The main goal in the setup pass 306 is to find FIBs and which gates belong to each cone, as well as to how many cones a given gate belongs to. By knowing which gates belong to each cone, we avoid traversing the whole design when a change is made. Also, since cones may overlap, we only remove a gate from the design when it belongs to zero cones.

Since the structure of the logic changes during synthesis, it is not sufficient to simply compare the netlists. Thus, we rely on SAT solvers to compare the elaborated and the synthesized netlists. To reduce the search space, we assume that the synthesis flow has kept user-defined net names unchanged (except for appending instance names), which we have observed in all five flows tested (commercial and open source). It is fine to miss some equivalence between nets, this only would increase the size of regions, but would not jeopardize the method as a whole. We then compare the function implemented by each of the logic cones. To account for retiming (i.e., changing of flop position) that may have occurred during synthesis, we just count the number of flops between each pair of FIBS. Although our results show that this is a very long step, it only needs to be performed once (prior to the execution of the flow), so this is not a huge problem. Also, this time could be mitigated with better integration with the synthesis flow to keep track of FIBs.

Determining Block Size

Partition size has a major impact on synthesis time, especially because synthesis time is not linear with design time. LiveSynth targets a few seconds synthesis time. To achieve that target, one must define what design sizes would be feasible. To better understand how synthesis time varies with design time and thus define our target partition size, the inventors performed a preliminary experiment: Different modules of different sizes where synthesized in two synthesis tools, a commercial tool and Yosys (a framework for Verilog RTL synthesis). This experiment allowed the inventors to evaluate how blocks of varying sizes would affect synthesis time (the synthesized blocks were sub-sets of benchmarks). Small blocks are of most interest.

The results of the experiment are graphed in FIG. 1, which shows how synthesis time varies super-linearly depending on design size. In the tests, designs with less than about 5,000 gates, had the least variation in synthesis time.

For small designs (i.e., under 5,000 gates) there is little variation in design time, whereas for designs too small (less than one thousand gates), most of the time is consumed in tool overhead, which would be wasteful. This data suggests that the 1000-5000 gates size offers a decent trade-off between amount of work done and runtime. Therefore, LiveSynth embodiments preferably use design partitions in this range.

Partitioning Strategy: Invariant Cones

The choice of partitioning strategy has a major impact on synthesis time, area, and delay in incremental synthesis flows. Choosing modules as blocks would prevent inter-procedural optimizations, and thus is not a suitable approach due to degradation of QoR. Although re-synthesis in the totality of the design after the modified region is included into the original design yields very good results for both area and delay, it comes at a relatively high cost in runtime. In some existing designs, the incremental synthesis takes as much as 77% of the original runtime. This penalty is due to the necessity to pass through the whole design at least once.

LiveSynth takes a different approach. We want to maximize design quality at the same time that we reduce the synthesis time. LiveSynth uses the concept of invariant cones to take advantage of the idea that further optimization is not possible (or needed) within the boundaries of that region. Our definition of invariant cone is not tied to module boundaries, and thus leverages intra-module optimizations. Since LiveSynth does not artificially define partitions, the QoR impact is substantially reduced.

Functionally-invariant boundaries (FIBs) are the endpoints of invariant cones. A FIB is a net in the design whose functionality has not been changed during synthesis. This function is necessary, but the way it is calculated is unimportant. Global inputs and outputs are (always) FIBs. A change due a "don't care" condition is considered a functional change and thus, the node is not a FIB.

Figure 2:
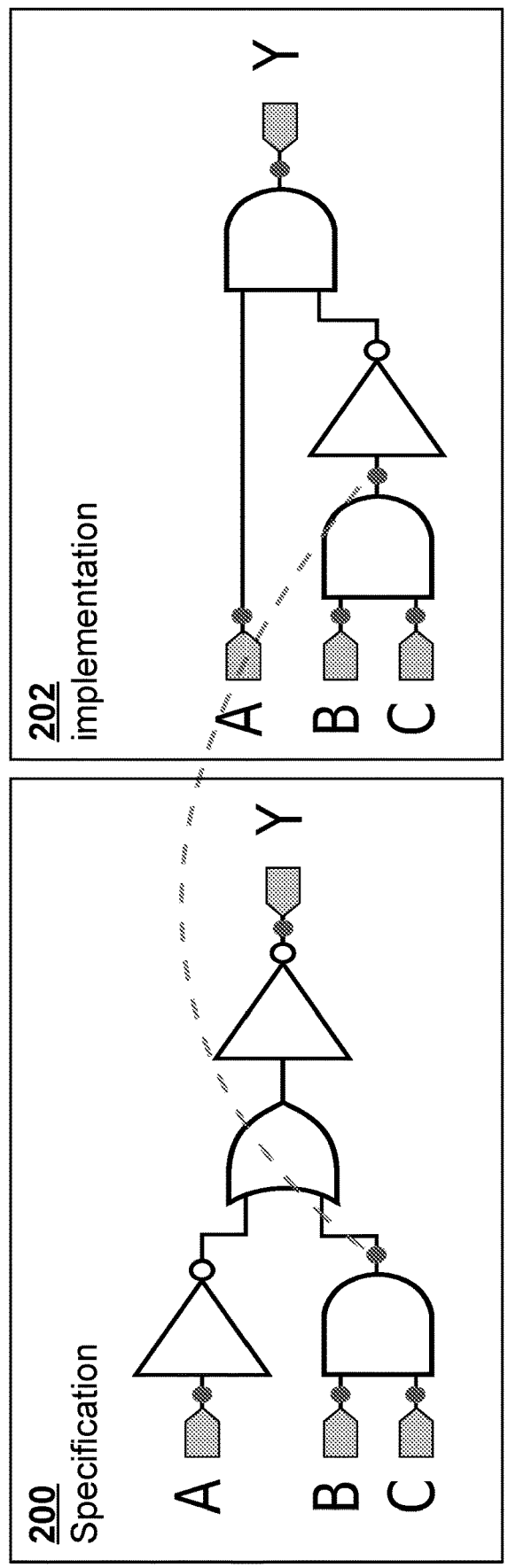
FIG. 2 is a schematic diagram illustrating how functionally-invariant boundaries provide a boundary for incremental synthesis, according to teachings of the present invention.

FIG. 2 illustrates how functionally-invariant boundaries provide a boundary for incremental synthesis. This example shows how the synthesis process may change the implementation of the logic function $f=!(!a+bc)$ to $f=a\cdot!(bc)$. On the left is the specification 200 of the function. On the right is the implementation 202. In this case, there are two invariant cones: $fib_1=bc$ and $fib_2=!a\cdot!fib_1$. Note that internal nodes in $fib_2$ presented logic changes and thus do not constitute an functionally-invariant boundary.

Table 1 shows statistics of the number of gates per invariant cone for our benchmarks. Most of the invariant cones present in our benchmarks are smaller than the proposed target. We note that there is no clear trend in the distribution of cone sizes. Some cases, like the fpu, have smaller than ideal cone size and others, like the mips, have greater than ideal cone sizes. Our main conclusion from this observation is that it would be possible to merge a good number of cones in designs like the fpu and or1200 core, but ideally, the flow could leverage further splitting some blocks in the mips.

TABLE 1

| Invariant Cone Size | fpu | mips | or1200 |
| --- | --- | --- | --- |
| <200 | 1769 | 1237 | 643 |
| 200-300 | 99 | 73 | 172 |
| 300-400 | 938 | 35 | 156 |
| 400-500 | 1 | 2 | 185 |
| 500-600 | 649 | 11 | 74 |
| 600-800 | 34 | 316 | 63 |
| 800-1000 | 33 | 29 | 58 |
| 1000-1500 | 5 | 124 | 56 |
| 1500-2000 | 1 | 550 | 0 |
| 2000-3000 | 0 | 421 | 0 |
| 3000-4000 | 0 | 302 | 0 |
| >4000 | 0 | 115 | 0 |

Live Phase

After setup 300, the LiveSynth flow enters a interactive (or "live") phase 302 that provides designers feedback within a few seconds. This Live phase performs the interactive incremental synthesis 308 each time a designer makes a valid change.

In the live phase, LiveSynth extracts a small subset of the design for synthesis and merges it back into the original synthesized netlist, quickly achieving results comparable to the non-incremental synthesis. Place and route are not included. The live phase is split into three steps: Netlist Diff 310, Partition Synthesis 312, and Netlist Stitch 314. The Setup phase 300 performs initial synthesis 304 then performs a setup pass 306 that identifies FIBs (and respective invariant cones) between the spec0 and impl0. In the live phase 302, whenever a change is made in the RTL, the interactive pass 308 is performed. The changed file 316 passes elaboration 318, and the modified netlist is structurally compared to spec0 in Netlist Diff 310. The structural comparison only matches the portions of the netlist that are identical in their logic structure, and thus has linear complexity with the module size. The main goal of this step is to identify which invariant cones have been changed.

The final incremental synthesis region can include multiple cones. This is because a single code change may affect multiple cones, due to the overlapping nature of cones. This is depicted in FIGS. 4A-B. FIG. 4A shows the original design, while FIG. 4B shows the modified design. A single gate change in the design impacts multiple invariant cones that will need to be synthesized. In this case, a single gate change in a design that affects two invariant cones 400 and 402.

After Netlist Diff 310, the extracted netlist containing all the modified invariant cones is synthesized 312. Then, the resulting netlist replaces the equivalent invariant cones in the original synthesized netlist. Note that only the small region that was modified is synthesized during the Live-Synth synthesis step 312, which is a key factor for synthesis speed.

Incremental Synthesis

Any incremental synthesis approach looks into applying changes in the RTL specification of a design to an existing implementation. Conceptually, this process involves 4 netlists:

spec0 and spec1: These are the netlists after elaboration (and before synthesis) for the original (spec0) and modified (spec1) RTL, respectively. We refer to these as elaborated netlists.

impl0 and impl1: These are the synthesized netlists for the original (impl0) and modified (impl1) RTL. We refer to these as synthesized netlists.

The objective of incremental synthesis is to create impl1 that implements spec1 by utilizing as much as possible from impl0. In LiveSynth, spec1 is not fully generated: only the modified files will pass elaboration, whereas the remainder of the modules are inferred from spec0, since they did not change.

To avoid the need of arbitrarily defining incremental regions, which was shown to degrade synthesis quality, LiveSynth first synthesizes the entire design and then finds regions that can be used for incremental synthesis.

Netlist Diff

The Netlist Diff step 310 finds which portions of the netlist have changed. We compare the modules that have been changed (identified by system time stamp) of spec1 with the original modules of spec0. We traverse the netlist, starting at each FIB and going backwards, until a new FIB is found. If a difference is found, we mark the cone for synthesis. If the traversal does not spot a difference in the netlist, we ignore that region.

This structural comparison is fast since it only matches logic that is implemented in the exact same way. Note that to make this search fast, we assume that nets with the same ID are equivalent. Then, the search itself is responsible for proving that the two cones are structurally, and thus, functionally identical. The ID is the concatenation of instance names and the net name in the leaf instance. This allows for uniqueness of identifiers.

During Netlist Diff 310, we also keep track of which gates are part of the cone, and thus we know which gates need to be synthesized when Netlist Diff is done. The process is depicted in the following Netlist Diff algorithm:

```
1:  procedure DIFF (FIB old, FIB new)
2:      diff_cone ← Set.new
3:      same ← same_operation(old.op,new.op)
4:      for idx ← 0; idx < new.fanin.size; idx++ do
5:          if ! is_fib(fanin(new,idx)) then
6:              diff_cone.append(fanin(new,idx))
7:              same ← same & diff(fanin(old,idx),fanin(new,idx))
8:          end if
9:      end for
10:     return [same, diff_cone]
11: end procedure
```

Partition Synthesis

After Netlist Diff, the marked cones are extracted from the context of the design, and synthesized on their own in Partition Synthesis 312. We carefully set nets as inputs and outputs to this new design to avoid them being optimized away. Since the block being synthesized does not necessarily begin and end in flops, we set input and output delays according to the ones reported in the original synthesis. This forces the synthesis to account for the delay of the logic that was not included in the block. Timing constraints are also set in accordance with the original design.

Figure 5A:
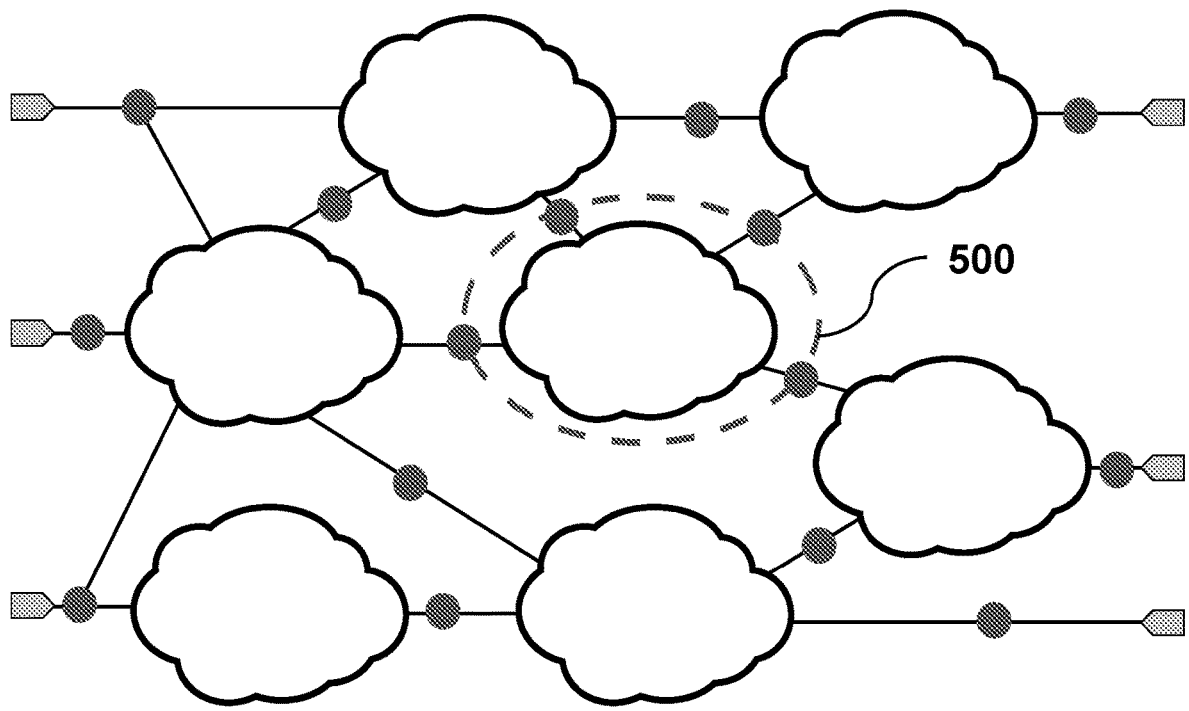
FIGS. 5A-B show a marked cone in a design, and the marked region extracted from the design for incremental synthesis, according to teachings of the present invention.
Figure 5B:
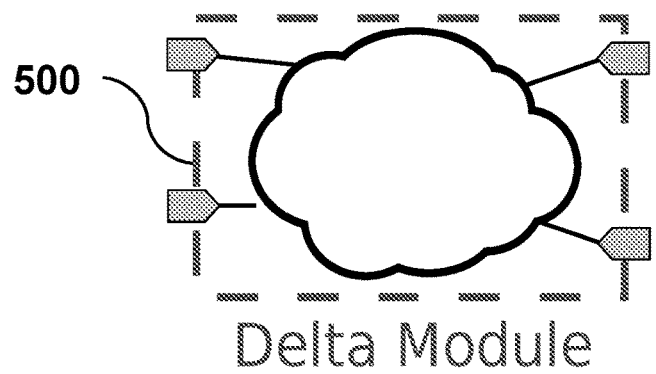

FIGS. 5A-B illustrates how, instead of triggering synthesis in the whole design, LiveSynth extracts the changed region 500 of a design that needs to be synthesized. This is a key point for speed in our scheme. FIG. 5A shows a marked cone 500 in a design, and FIG. 5B shows the region extracted, which is synthesized on its own in Partition Synthesis.

Netlist Stitch

After the delta synthesis 312, the resulting netlist is reattached to impl0 to create impl1 in the Netlist stitch step 314. Also, any unused nets are removed, since synthesis will not be triggered over the whole design. Thus, we first inspect each gate in the original invariant cone and decrement its counter, removing from the design any gate that reaches the count of zero (see Netlist Stitch algorithm below).

This procedure is sub-optimal for area, since it may result in redundancy. This overhead is small for each synthesis increment, but may accumulate over the course of multiple changes.

However, note that a small hit in area (of around up to 5%) is more tolerable than the same hit in delay.

Netlist Stitch Algorithm

```
1:  procedure STITCH (impl0, new_gates, old_gates, gate_count)
2:      for all gate ← old_gates do
3:          gate_count[gate.id]–
4:          if gate_count[gate_id] == 0 then
5:              remove(impl0, gate.id)
6:          end if
7:      end for
8:      for all (gate ← new_gates) do
9:          insert(impl0, gate.id)
10:     end for
11: end procedure
```

Dealing with Delay Degradation

To reduce delay penalties, when a critical path crosses the boundary of the changed region, the neighboring region is also included in for synthesis. This increases the runtime, but reduces delay impact on the final circuit. Another possibility would be to extend the partition definition, so the critical paths always lie within a region. One option not explored here is to trigger a second incremental synthesis when there is frequency degradation, however, it is not possible to know if the degradation is due to the flow or the change introduced.

Evaluation

Testing by the inventors show that LiveSynth is able to reduce synthesis time by about a factor of ten on average, but with high variation. LiveSynth is consistently faster than any of the previous approaches. Also, we only observe delay degradation in only a minority of design changes, and only with small magnitudes (less than 3%). Advantageously, LiveSynth allows inter-module optimization, provides fast feedback, and is independent of a specific synthesis tool.

LiveSynth may be implemented in a variety of ways. In one example, LiveSynth was implemented in Ruby 2.3 on top of Yosys, a tool based on ABC (a software system for synthesis and verification), targeting Xilinx FPGAs. Placement and Routing were done using Xilinx Vivado 2014.2, QoR results are reported after routing. The inventors compared QoR in this implementation with full synthesis for each change. LiveSynth runtime was compared with LLIR and Rapid Recompile from Altera Quartus-II 2016.2. The experiments were run on 2 Intel® Xeon® E5-2689 CPUs at 2.60 GHz, with 64 GB of DDR3 memory, ArchLinux 4.3.3-3 server.

Benchmarks

We utilized three benchmarks: in-house Floating Point Unit (fpu), the open source MIPSfpga microMIPS core (mips), the OR1200 RISC core (or1200). To choose the benchmarks, we looked for open source benchmarks, possibly with public access to versioning control, that were large but would fit commercial FPGAs.

Change Insertion

To emulate design changes, we inserted code changes to the benchmarks, using define statements. The changes can be divided into random synthetic, commented out code, and repository diffs.

Commented out code was used when available. The same principle was applied to repository diffs when available. We looked for commits in nearby dates since we target small code changes. Commits that added entire modules or subsystems were not considered. The idea of using commits from repositories tries to mimic "real-word" work.

To increase the number of changes, we also use synthetic changes. We used a pseudo-random number generator to select a file and a line of code. Then a change was made around that line. Changes include flipping bits, inverting conditions in if statements, inverting the order of concatenations, changing constant, changing expressions, and switching between constant and wire.

The numbers of changes per benchmark are: fpu (32), mips (32), and or1200 (20). Our experiments start with all changes deactivated, and each change is incorporated with respect to the original run, independently of other changes. The only restriction on the changes inserted is the ability to synthesize the design. Changes can be single- or multi-line but always affect a single file and module. However, a changed module can be instantiated multiple times.

We begin our evaluation by showing the overall speedups achieved by LiveSynth and prior approaches for our benchmarks. Then, we provide a detailed runtime breakdown which allows us to better understand how time is being spent during LiveSynth. Finally, we provide QoR results to show the quality differences between a full synthesis and the incremental synthesis techniques studied.

Overall Results

Figure 6:
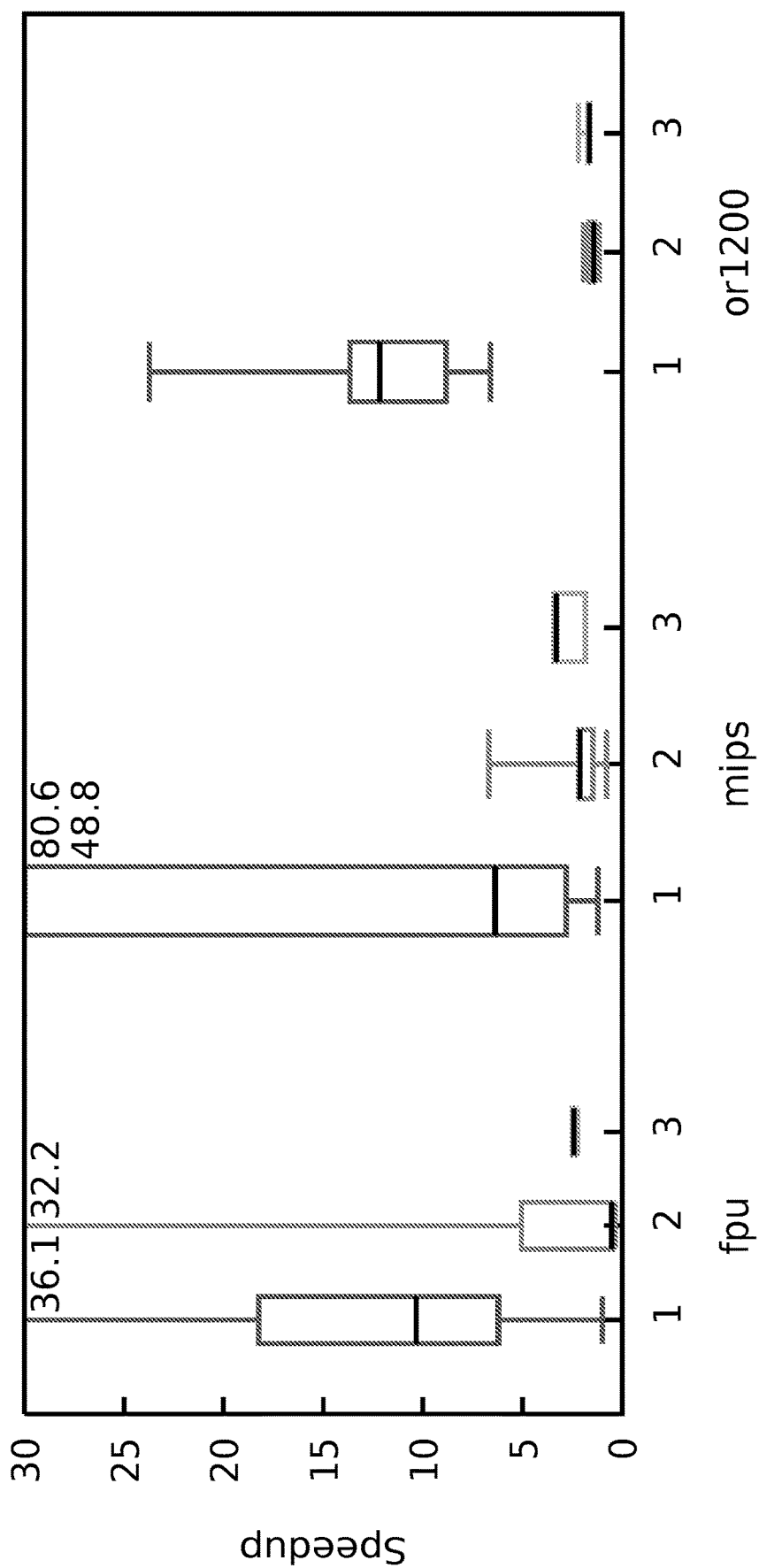
FIG. 6 is a graph illustrating how incremental synthesis improves the synthesis speed by an average of about a factor of ten compared to a full synthesis, according to embodiments of the invention.

Our experiments show that LiveSynth was able to reduce synthesis runtime by 10× (median value) when compared to the full synthesis (FIG. 6). In absolute numbers, this means a reduction from around 40 s to around 4 s in LiveSynth, but only to around 20 s when using LLIR. For Quartus-II, the reduction was from around 120 s with full synthesis to around 45 s in the incremental version. We note that Live-Synth only launches synthesis when the code change affects the elaborated netlist, which is not always the case.

FIG. 6 is a graph that illustrates how LiveSynth improves the synthesis speed by an average of about a factor of ten compared to a full synthesis. Each bar shows minimum, maximum and first, second and third quartiles for (1) Live-Synth, (2) LLIR and (3) Quartus. Values higher than the y-range are reported next to the bar.

Quartus-II has an almost flat improvement in synthesis time of around 2×, which is surprising due to the nature of the compilation. Since there are not many details on the implementation of the flow available, it is not possible to understand why this behavior occurred. Both LiveSynth and LLIR have large variation in the speedup results, which is expected since each change to the RTL has a different impact in the final design.

Runtime Breakdown and Setup Time

We also report the runtime breakdown of LiveSynth. The longest step is the setup phase. Results are shown in Table 2. Finding FIBs is in general slower than the full synthesis, but as mentioned, this is not a huge problem since it is only performed once before design changes are made. We also emphasize that this could be mitigated with better integration with the synthesis step or by implementing the flow in a faster language such as C++.

TABLE 2

| Benchmark | Synthesis Time (s) | Find FIBs (s) |
| --- | --- | --- |
| fpu | 37 | 375 |
| mips | 90 | 1403 |
| or1200 | 22 | 84 |

Figure 7:
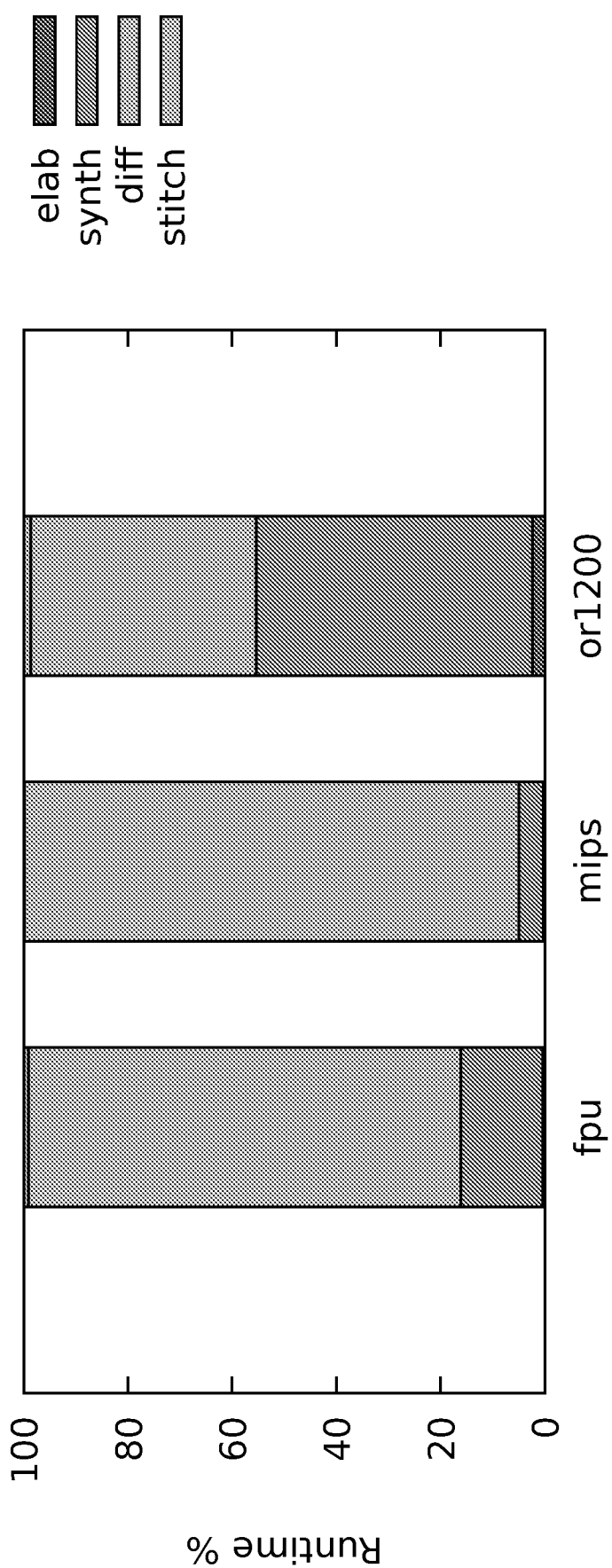
FIG. 7 is a graph illustrating runtime breakdown for different steps of the interactive pass, according to embodiments of the invention.

FIG. 7 is a graph illustrating runtime breakdown for the incremental step, showing how LiveSynth spends most of the time finding the difference between two designs. Synthesis time is around 10-40% of the total time depending on the benchmark. A considerable amount of time is spent in finding Netlist Diff (50-90%, depending on the benchmark). LLIR (not shown) uses 60-90% of the time in re-synthesis on average (across benchmarks). This is because LLIR requires a pass over the whole design for synthesis, which even if no work takes time. We note that the algorithm was implemented in Ruby, and runtime is expected to improve by a few times just by switching to a more efficient language such as C++. Stitch is not visible on the plot since it only takes a few milliseconds. Although LiveSynth requires a setup step, this setup is only executed once (before changes are inserted), and then multiple incremental synthesis steps can be performed without the need for running setup again.

QoR Degradation

Figures 8A, 8B, 8C:
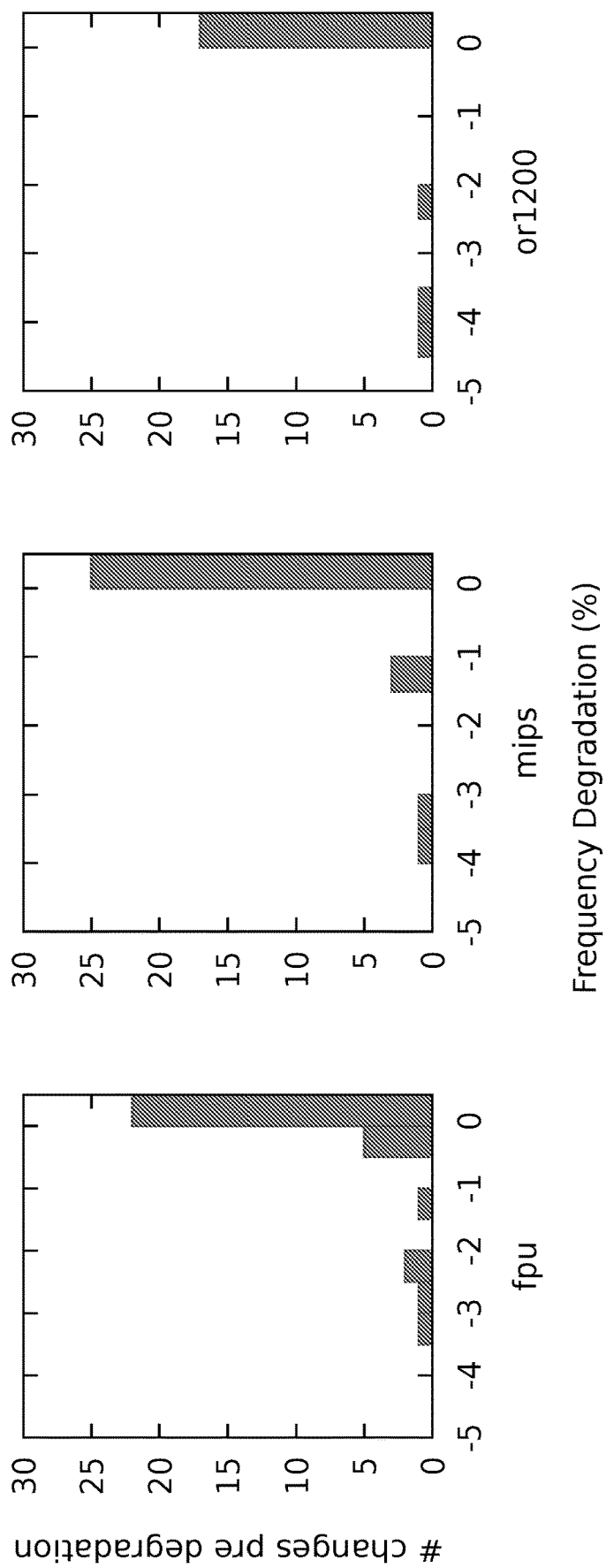
FIGS. 8A-C are graphs of number of changes pre-degradation vs. frequency degradation percent, showing that incremental synthesis according to embodiments of the present invention delivers the same frequency as a full synthesis.

Finally, we investigate the QoR after LiveSynth. Some losses are expected due to the nature of our approach. Our results were compared against the regular synthesis of the full design and show that for most of the design changes, there are no degradations in delay. The maximum delay degradation was around 4.5% due to the incremental flow. FIGS. 8A-C shows the distribution of frequency degradation per change for each benchmark. In some cases, we observed a slight increase in frequency, but since it comes from noise in the synthesis tool we do not report it.

FIGS. 8A-C are graphs showing that, in most of the test cases, LiveSynth delivers the same frequency as a full synthesis. In the few cases where there were degradations, the hit on delay was around 4.5%.

CONCLUSIONS

Slow turnaround time for synthesis is one of the main bottlenecks in hardware design productivity. An interactive synthesis flow will reduce design time by allowing faster iterations between code changes and results.

Embodiments of the present invention are implementations of LiveSynth, an incremental synthesis flow independent of specific tools. LiveSynth leverages natural invariant boundaries to reduce the impact of splitting the design into regions while minimizing the impact on QoR. LiveSynth minimizes the amount of work that needs to be done by: 1) only elaborating RTL files that were changed by the designs, and 2) avoiding launching synthesis over the whole design. When a critical path lies within the boundaries of the incremental region, LiveSynth includes neighboring regions to reduce the hit on frequency.

Our results show that LiveSynth is able to reduce synthesis time by an average of a factor of ten. We also show that LiveSynth has small impact on delay (frequency) for only a few design changes but always smaller than 5%.

The present invention is not intended to be limited by the specific embodiments described herein for the purposes of illustration. Variations of the principles of the invention will be evident based on the teachings provided herein. In addition, the inventors envision additional variations. For example, the method may include partitioning blocks further and applying disjoint decomposition techniques that can split a block without compromising QoR. This should improve runtime in larger blocks observed in some of the benchmarks and thus further improve our results. The methods of the invention may also include leveraging incremental placement and routing already present in FPGA flows.

The invention claimed is:

1. A method for interactive incremental synthesis flow for integrated circuit design, the method comprising:
   a) performing a full synthesis of a circuit design to produce an elaborated netlist and synthesized netlist;
   b) based on the elaborated netlist and synthesized netlist, automatically partitioning the circuit design into invariant cone regions whose functionality do not change during synthesis; and
   c) performing an incremental synthesis each time a change is made to the circuit design, wherein the incremental synthesis comprises:
      i) performing an elaboration of a module of the design containing the change;
      ii) performing a structural comparison between the elaborated netlist and a modified elaborated netlist to identify modified invariant cones containing the change;
      iii) synthesizing gates contained in the modified invariant cones;
      iv) deleting from the synthesized netlist the gates contained within the modified invariant cones that have been changed; and
      v) inserting the synthesized gates corresponding to the modified invariant cones into the synthesized netlist.

2. The method of claim 1 wherein each of the invariant cone regions has endpoints that are functionally invariant boundaries.

3. The method of claim 1 wherein the invariant cone regions contain between 1000 and 5000 gates.

4. The method of claim 1 wherein automatically partitioning comprises identifying which gates belong to which invariant cone regions.

5. The method of claim 1 further comprising, when there are no pending incremental small jobs, removing from the synthesized netlist imperfections introduced in synthesizing gates contained in the modified invariant cones.

* * * * *